Figure 1:
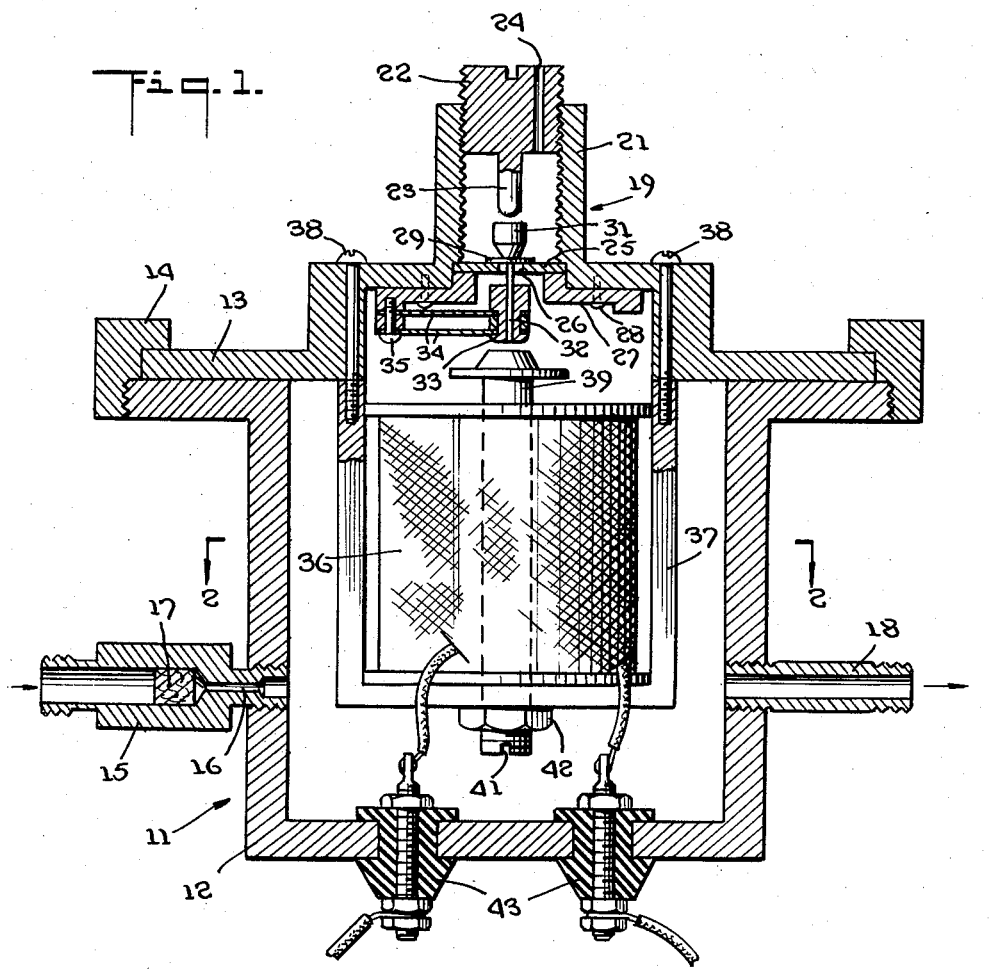

July 22, 1958

L. GRIFFITH 2,844,157

ELECTROPNEUMATIC TRANSDUCER

Filed June 4, 1954

INVENTOR.
LEONARD GRIFFITH
BY
ATTORNEY

United States Patent Office 2,844,157
Patented July 22, 1958

2,844,157
ELECTROPNEUMATIC TRANSDUCER

Leonard Griffith, Edmonton, Alberta, Canada, assignor to Canadian Chemical Company, Ltd., Montreal, Quebec, Canada, a corporation of Canada Application June 4, 1954, Serial No. 434,618

2 Claims. (Cl. 137—82)

This invention relates to a transducer and relates more particularly to a transducer for converting electrical changes into changes in fluid pressure.

An important object of this invention is to provide a transducer which will be especially simple in construction and efficient and reliable in operation.

A further object of this invention is to provide a transducer which will convert electrical changes, as from a measuring device, into changes in fluid pressure, as for operating a control device.

Other objects of this invention, together with certain details of construction and combinations of parts, will be apparent from the following detailed description and claims.

According to the present invention, there is provided, in a transducer for converting electrical changes into changes in fluid pressure, a chamber having an inlet into which a fluid, such as air, is introduced from a source at constant pressure through a restricted aperture, such as a valve, capillary or other suitable means, which will limit the rate of flow of fluid into the chamber. Connected to the chamber through an outlet to which the pressure in the chamber is applied is a control device such as a valve or the like, which is to be operated by variations in pressure within the chamber. Also connected to the chamber is a bleed mechanism which permits a controlled amount of air to escape from the chamber whereby the pressure within the chamber will vary.

The bleed mechanism comprises means provided with an escape port such as an aperture through which air can escape from the chamber and closing means, such as a disc, adapted to close said escape port and prevent the flow of air therethrough. The closing means is designed so that it will close the escape port when no pressure is applied to the interior of the chamber. However, when air under pressure is introduced into the chamber, the pressure developed in the chamber will move the closing means away from the escape port and permit air to flow out of the chamber. The escape of air will cause a drop in pressure in the chamber and on the outlet from the chamber and also on the control device connected to said outlet. Means, such as an adjustable stop, are provided for limiting the movement of the closing means so as to control the maximum rate at which the air can escape from the chamber. By adjusting this stop and in this way limiting the maximum rate at which air can escape from the chamber it is possible to control the lowest pressure that will be reached in the chamber over a wide range.

The bleed-off mechanism also includes electrical means, such as an electromagnet, positioned to urge the closing means against the escape port and thereby reduce the flow of air through said port. As a result, the pressure in the chamber will increase as will the pressure on the outlet and the control device connected thereto. The electromagnet is energized by current from the measuring device in such a way that its field strength will vary with changes in the current and it will exert a larger or smaller force on the closing means depending upon the current. This will cause corresponding changes in the rate at which air can escape from the chamber and thereby in the pressure in the chamber and on the outlet from the chamber and on the control device connected to said outlet.

Figure 2:
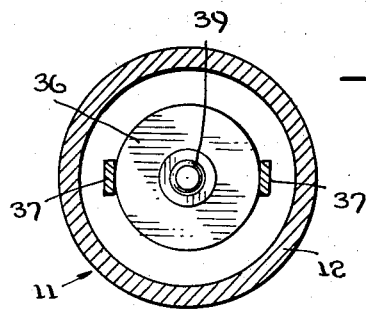

A preferred embodiment of this invention is shown in the accompanying drawing wherein Fig. 1 is a cross-sectional view of the transducer, and Fig. 2 is a cross-sectional view, on a reduced scale, taken along the line 2—2 in Fig. 1 in the direction of the arrows.

Referring now to the drawing, the reference numeral 11 designates generally a chamber comprising a base 12 to which a cap 13 is secured by means of a ring 14 in threaded engagement with said base. Leading into chamber 11 is a conduit 15 to which air is supplied from a constant pressure source (not shown). The conduit 15 is provided with a capillary section 16 to restrict the rate at which air can flow into the chamber 11 and also has positioned therein a plug 17 of filtering material, such as glass wool, to remove from the air any foreign particles entrained therein. Leading from the chamber 11 is a conduit 18 which will provide a supply of air at a lower and controlled pressure to any suitable mechanism, such as a control device (not shown), in a manner more fully described below.

Also leading from the chamber 11 is a bleed mechanism, indicated generally by reference numeral 19, through which a controlled amount of air is permitted to escape from the chamber 11. The bleed mechanism 19 comprises an internally threaded tubular housing 21 extending upwardly from the cap 13. A plug 22, provided with a downwardly projecting finger 23 and having an aperture 24 extending therethrough, is adjustably secured in the tubular housing 21 and serves, as will be described more fully below, to set the minimum air pressure that will be applied to the conduit 18. Positioned at the lower end of the tubular housing 21 is a plate 25 having a centrally disposed aperture 26 therein, which plate is held securely in place by means of a strap 27 that is secured to the under surface of the cover 13 by screws 28. The plate 25 has seated thereon a disc 29 which is adapted to close the aperture 26 and prevent the flow of air therethrough. The disc 29 is provided with an upwardly extending head 31 and is fastened to the upper end of a rod 32, the lower end of which rod is fastened to a soft iron armature 33 which is supported and guided for vertical movement by means of a pair of leaf springs 34 that are secured to the strap 27 by a screw 35.

Positioned within the chamber 11 is a coil 36 supported by a U-shaped strap 37 which is fastened to the cover 13 by means of bolts 38. The coil 36 comprises an electromagnet and is provided with a centrally disposed pole piece 39 which extends into close proximity to the armature 33. The lower end of the pole piece 39 is threaded and is provided with a slot 41 and the said pole piece is supported by a nut 42 secured, as by welding, to the U-shaped strap 37. This arrangement permits the pole piece 39 to be adjusted vertically whereby its spacing from the armature 33 may be altered. Current is supplied to the coil 36 from a measuring instrument or the like (not shown) through terminals 43 that extend through the walls of chamber 11.

In operation, when air under pressure is supplied to the chamber 11 through the conduit 15 and there is no current flowing through the coil 36, the pressure of the air will raise the disc 29 from the plate 25 until the head 31 strikes the finger 23. This will uncover the aperture 26 and permit air to escape from the chamber 11 to the atmosphere. The amount of air that will escape depends on the extent to which the disc 29 is raised, which can be regulated by advancing or withdrawing the plug 22 to change the position of the finger 23. The escape of air through the bleed mechanism 19 will cause a drop in pressure in the chamber 11 to a value less than that of the supply pressure and the reduced pressure within said chamber will be applied to the conduit 18. When a current is caused to flow through the coil 36, the armature 33 will be drawn toward the pole piece 39 moving the disc 29 closer to the plate 25 and thereby restricting the escape of air from the chamber 11 through the bleed mechanism 19. As a result, the pressure of air in the chamber 11 will increase and the increased pressure will be applied to the conduit 18. The flow of different amounts of current through the coil 36 will cause different movements of the armature 33 and will thereby produce corresponding changes in the pressure within the chamber 11 and the conduit 18. The lowest pressure in the chamber 11 occurs when no current flows through the coil 36 and can be controlled by adjusting the plug 22 as described above. The smallest current which will cause any movement of the armature 33, and any increase in pressure from the lowest value, can be regulated by adjusting the pole piece 39 to change the spacing between said pole piece and the armature 33.

It is to be understood that the foregoing detailed description is given merely by way of illustration and that many variations may be made therein without departing from the spirit of my invention.

Having described my invention what I desire to secure by Letters Patent is:

1. A transducer for converting electrical changes into changes in fluid pressure comprising a chamber, an inlet having a restricted aperture therein for introducing a fluid under pressure into said chamber at a limited rate, an outlet from said chamber to which the pressure in said chamber is applied, and a bleed mechanism for permitting the escape of fluid from said chamber at a rate controlled by the electrical changes, said bleed mechanism comprising a tubular housing projecting upwardly from said chamber, a plate having an aperture therein through which fluid can escape from the chamber positioned in said tubular housing, a disc resting on said plate to close said aperture and prevent the flow of fluid therethrough, said disc being positioned so that the pressure of fluid in the chamber will move it away from the aperture, a rod extending downwardly from said disc through said aperture into said chamber, an armature operatively connected to the lower end of said rod, and an electromagnet in said chamber acting on said armature for urging said disc against said aperture.

2. A transducer for converting electrical changes into changes in fluid pressure comprising a chamber, an inlet having a restricted aperture therein for introducing a fluid under pressure into said chamber at a limited rate, an outlet from said chamber to which the pressure in said chamber is applied, and a bleed mechanism for permitting the escape of fluid from said chamber at a rate controlled by the electrical changes, said bleed mechanism comprising a tubular housing projecting upwardly from said chamber, a plate having an aperture therein through which fluid can escape from the chamber positioned in said tubular housing, a disc resting on said plate to close said aperture and prevent the flow of fluid therethrough, said disc being positioned so that the pressure of fluid in the chamber will move it away from the aperture, an adjustable plug in said tubular housing for limiting the movement of the disc, a rod extending downwardly from said disc through said aperture into said chamber, an armature operatively connected to the lower end of said rod, and an electromagnet in said chamber acting on said armature for urging said disc against said aperture.

References Cited in the file of this patent

UNITED STATES PATENTS

| | | |
|---|---|---|
| 901,613 | Herrgott | Oct. 20, 1908 |
| 1,389,056 | Lane | Aug. 30, 1921 |
| 1,887,322 | Nettleton | Nov. 8, 1932 |
| 1,973,769 | Lehn | Sept. 18, 1934 |
| 2,253,963 | Nest | Aug. 26, 1941 |
| 2,261,462 | Gabalis | Nov. 4, 1941 |
| 2,288,912 | Mears | July 7, 1942 |
| 2,577,680 | Harmon | Dec. 4, 1951 |
| 2,625,136 | Moog | Jan. 13, 1953 |
| 2,759,459 | Lucien | Aug. 21, 1956 |